(12) United States Patent
Li et al.

(10) Patent No.: US 9,936,521 B2
(45) Date of Patent: Apr. 3, 2018

(54) USER EQUIPMENT CONFIGURED TO PROVIDE SYNCHRONIZATION INFORMATION FOR SIDELINK D2D COMMUNICATIONS USING ALLOCATED RESOURCE UNITS

(71) Applicant: Intel Corporation, Santa Clara, CA (US)

(72) Inventors: Qinghua Li, San Ramon, CA (US); Honggang Li, Beijing (CN); Huaning Niu, Milpitas (CA); Yi Hsuan, Sunnyvale, CA (US); Yuan Zhu, Beijing (CN); Xiaogang Chen, Beijing (CN); Jong-Kae Fwu, Sunnyvale, CA (US); Alexei Vladimirovich Davydov, Nizhny Novgorod (RU); Hujun Yin, Saratoga, CA (US); Xintian E. Lin, Palo Alto, CA (US); Wendy C. Wong, San Jose, CA (US); Yujian Zhang, Beijing (CN); Apostolos Papathanassiou, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/261,439

(22) Filed: Sep. 9, 2016

(65) Prior Publication Data

US 2016/0381708 A1    Dec. 29, 2016

Related U.S. Application Data

(63) Continuation of application No. 13/729,164, filed on Dec. 28, 2012, now Pat. No. 9,661,658.
(Continued)

(51) Int. Cl.
*H04W 74/08* (2009.01)
*H04W 28/08* (2009.01)
(Continued)

(52) U.S. Cl.
CPC ....... *H04W 74/0808* (2013.01); *H04L 5/0001* (2013.01); *H04L 5/0023* (2013.01);
(Continued)

(58) Field of Classification Search
CPC ... H04L 12/189; H04L 5/0037; H04L 5/0044; H04L 5/0048; H04L 5/0053;
(Continued)

(56) References Cited

U.S. PATENT DOCUMENTS 7,733,898 B2    6/2010  Mattina et al.
7,801,231 B2 *  9/2010  Tarokh ................ H04L 27/2613
                                                        370/203
(Continued)

FOREIGN PATENT DOCUMENTS

AU    2013245908 B2    2/2016
EP       1933507 A1    6/2008
(Continued)

OTHER PUBLICATIONS

"U.S. Appl. No. 13/729,164, Notice of Allowability dated Feb. 8, 2017", 6 pgs.
(Continued)

*Primary Examiner* — Ian N Moore
*Assistant Examiner* — Mewale Ambaye
(74) *Attorney, Agent, or Firm* — Schwegman Lundberg & Woessner, P.A.

(57) ABSTRACT

A signal structure for use in D2D communications is described. In one embodiment, a preamble for automatic gain control at the receiver end is included in the transmitted signal. Techniques for scheduling of D2D transmissions
(Continued)

using carrier sensing multiple access (CSMA) and a power control schemes for interference management are also described.

20 Claims, 5 Drawing Sheets

Related U.S. Application Data

(60) Provisional application No. 61/624,185, filed on Apr. 13, 2012.

(51) Int. Cl.

| | | |
|---|---|---|
| H04W 76/02 | (2009.01) | |
| H04W 4/06 | (2009.01) | |
| H04L 5/14 | (2006.01) | |
| H04L 5/00 | (2006.01) | |
| H04W 28/02 | (2009.01) | |
| H04W 72/04 | (2009.01) | |
| H04W 24/10 | (2009.01) | |
| H04W 36/08 | (2009.01) | |
| H04W 24/02 | (2009.01) | |
| H04W 4/00 | (2018.01) | |
| H04W 72/08 | (2009.01) | |
| H04L 12/18 | (2006.01) | |
| H04W 36/00 | (2009.01) | |

(52) U.S. Cl.
CPC .......... *H04L 5/0037* (2013.01); *H04L 5/0044* (2013.01); *H04L 5/0048* (2013.01); *H04L 5/0053* (2013.01); *H04L 5/0064* (2013.01); *H04L 5/0094* (2013.01); *H04L 5/14* (2013.01); *H04W 4/005* (2013.01); *H04W 4/06* (2013.01); *H04W 24/02* (2013.01); *H04W 24/10* (2013.01); *H04W 28/02* (2013.01); *H04W 28/0268* (2013.01); *H04W 28/08* (2013.01); *H04W 36/08* (2013.01); *H04W 72/04* (2013.01); *H04W 72/042* (2013.01); *H04W 72/0406* (2013.01); *H04W 72/085* (2013.01); *H04W 74/0833* (2013.01); *H04W 76/02* (2013.01); *H04W 76/023* (2013.01); *H04L 12/189* (2013.01); *H04W 36/0016* (2013.01); *H04W 76/028* (2013.01); *Y02B 60/50* (2013.01)

(58) Field of Classification Search
CPC .... H04L 5/0064; H04W 28/02; H04W 28/08; H04W 28/0268; H04W 36/0016
See application file for complete search history.

(56) References Cited

U.S. PATENT DOCUMENTS

| | | | |
|---|---|---|---|
| 9,055,474 B2 | 6/2015 | Heo et al. | |
| 9,066,258 B2 | 6/2015 | Li et al. | |
| 9,107,103 B2 | 8/2015 | Fong et al. | |
| 9,119,097 B2 | 8/2015 | Chatterjee et al. | |
| 9,125,091 B2 | 9/2015 | Heo et al. | |
| 9,143,984 B2 | 9/2015 | Zhu et al. | |
| 9,232,437 B2 | 1/2016 | Khoryaev | |
| 9,325,485 B2 | 4/2016 | Li et al. | |
| 9,661,658 B2 | 5/2017 | Li et al. | |
| 9,736,861 B2 | 8/2017 | Chatterjee | |
| 2006/0045120 A1 | 3/2006 | Mattina et al. | |
| 2010/0157918 A1 | 6/2010 | Kim, II et al. | |
| 2010/0238877 A1 | 9/2010 | Nam et al. | |
| 2011/0110273 A1* | 5/2011 | Copeland | H04L 1/0015 370/255 |
| 2011/0268006 A1 | 11/2011 | Koskela et al. | |
| 2011/0305179 A1 | 12/2011 | Wang et al. | |
| 2011/0317586 A1 | 12/2011 | Palanki et al. | |
| 2012/0093098 A1 | 4/2012 | Charbit et al. | |
| 2012/0250636 A1* | 10/2012 | Wang | H04W 72/08 370/329 |
| 2012/0300662 A1* | 11/2012 | Wang | H04W 72/02 370/252 |
| 2013/0170387 A1* | 7/2013 | Wang | H04W 4/005 370/252 |
| 2013/0272262 A1 | 10/2013 | Li et al. | |
| 2014/0057670 A1* | 2/2014 | Lim | H04W 8/005 455/509 |

FOREIGN PATENT DOCUMENTS

| | | | |
|---|---|---|---|
| JP | 2015518333 A | 6/2015 | |
| JP | 5986289 B2 | 9/2016 | |
| JP | 2017005740 A | 1/2017 | |
| KR | 101612358 B | 4/2016 | |
| RU | 2189706 C2 | 9/2002 | |
| RU | 2593269 C2 | 8/2016 | |
| WO | WO-2010028307 A1 | 3/2010 | |
| WO | WO-2010137004 A1 | 12/2010 | |
| WO | WO-2010139847 A1 | 12/2010 | |
| WO | WO-2011033612 A1 | 3/2011 | |
| WO | WO-2011036507 A1 | 3/2011 | |
| WO | WO-2011088619 A1 | 7/2011 | |
| WO | WO-2012034269 A1 | 3/2012 | |
| WO | WO-2013155253 A1 | 10/2013 | |

OTHER PUBLICATIONS

"U.S. Appl. No. 13/729,164, Notice of Allowance dated Jan. 23, 2017", Examiner Interview Summary from Jan. 23, 2017 included, 14 pgs.
"U.S. Appl. No. 13/729,164, Response filed Sep. 30, 2016 to Non Final Office Action dated Jun. 30, 2016", 11 pgs.
"European Application Serial No. 16190527.8, Extended European Search Report dated Apr. 10, 2017", 7 pgs.
"Mexican Application Serial No. MX/a/2014/011698, Response filed Nov. 4, 2016 to Office Action dated Aug. 18, 2016", W/ English Claims, 17 pgs.
"Russian Application Serial No. 2016125897, Response filed Oct. 12, 2016 to Office Action dated Aug. 2, 2016", w/ English Claims, 10 pgs.
"U.S. Appl. No. 13/729,164, Advisory Action dated Sep. 24, 2015", 4 pgs.
"U.S. Appl. No. 13/729,164, Final Office Action dated Jul. 16, 2015", 17 pgs.
"U.S. Appl. No. 13/729,164, Non Final Office Action dated Jan. 23, 2015", 17 pgs.
"U.S. Appl. No. 13/729,164, Non Final Office Action dated Jun. 30, 2016", 21 pgs.
"U.S. Appl. No. 13/729,164, Response filed Apr. 23, 2015 to Non Final Office Action dated Jan. 23, 2015", 10 pgs.
"U.S. Appl. No. 13/729,164, Response filed Sep. 16, 2015 to Final Office Action dated Jul. 16, 2015", 10 pgs.
"Australia Application Serial No. 2013245908, First Examiner Report dated Mar. 26, 2015", 3 pgs.
"Australia Application Serial No. 2013245908, Response filed Dec. 15, 2015 to First Examiner Report dated Mar. 26, 2015", 13 pgs.
"Brazilian Application Serial BR1120140244812, Voluntary Amendment filed Dec. 8, 2015", 11 pgs.
"Canadian Application Serial No. 2,869,000, Office Action dated Jan. 15, 2016", 3 pgs.
"Canadian Application Serial No. 2,869,000, Response filed Jul. 5, 2016 to Office Action dated Jan. 15, 2016", 13 pgs.
"European Application Serial No. 13776055.9, Extended European Search Report dated Dec. 7, 2015", 6 pgs.
"European Application Serial No. 13776055.9, Office Action dated Jan. 4, 2016", 1 pg.
"International Application Serial No. PCT/US2013/036085, International Preliminary Report on Patentability dated Oct. 23, 2014", 10 pgs.

(56) References Cited

OTHER PUBLICATIONS

"International Application Serial No. PCT/US2013/036085, International Search Report dated Jun. 28, 2013", 7 pgs.
"International Application Serial No. PCT/US2013/036085, Written Opinion dated Jun. 28, 2013", 8 pgs.
"Japanese Application Serial No. 2015-505892, Office Action dated Oct. 6, 2015", 4 pgs.
"Japanese Application Serial No. 2015-505892, Response filed Jan. 5, 2016 Office Action dated Oct. 6, 2015", 21 pgs.
"Korean Application Serial No. 2014-7027037, Final Office Action dated Nov. 10, 2015", 5 pgs.
"Korean Application Serial No. 2014-7027037, Office Action dated Jun. 1, 2015", 10 pgs.
"Korean Application Serial No. 2014-7027037, Response filed Aug. 3, 2015 to Office Action dated Jun. 1, 2015", 28 pgs.
"Korean Application Serial No. 2014-7027037, Response filed Dec. 11, 2015 to Final Office Action dated Nov. 10, 2015", 27 pgs.
"Mexican Application Serial No. MX/a/2014/011698, Office Action dated Aug. 18, 2016", Without English Translation, 3 pgs.
"Russian Application Serial No. 2014138943 office Acton dated Nov. 10, 2015", 10 pgs.
"Russian Application Serial No. 2016125897, Office Action dated Aug. 2, 2016", Without English Translation, 2 pgs.
"Russian Application Serial No. 2016125897, Office Action dated Jun. 21, 2017", w/ English Translation, 7 pgs.
"European Application Serial No. 16190527.8, Response filed Nov. 9, 2017 to Extended European Search Report dated Apr. 10, 2017", 3 pgs.
"Indonesian Application Serial No. 00201405738, Office Action dated Oct. 26, 2017", with Concise Statement of Relevance, 3 pgs.
"Japanese Application Serial No. 2016-153870, Office Action dated Dec. 12, 2017", w/ English translation, 5 pgs.
"Operator Managed and Operator Assisted D2D", Intel, 3GPP Draft; S1-120063-Managed or Assisted D2D, 3rd Generation Partnership Project (3GPP), Mobile Competence Centre; 650, Route Des Lucioles; F-06921 Sophia-Antipolis Cedex; France, vol. SA WG1, no. Kyoto, Japan Feb. 13, 2012-Feb. 17, 2012, (Feb. 6, 2012), 1-5.

* cited by examiner

USER EQUIPMENT CONFIGURED TO PROVIDE SYNCHRONIZATION INFORMATION FOR SIDELINK D2D COMMUNICATIONS USING ALLOCATED RESOURCE UNITS

RELATED APPLICATIONS

This application is a continuation of U.S. patent application Ser. No. 13/729,164, which claims the benefit of priority under 35 U.S.C. 119(e) to U.S. Provisional Patent Application Ser. No. 61/624,185, filed on Apr. 13, 2012, now issued as U.S. Pat. No. 9,661,658, each of which is incorporated herein by reference in its entirety.

BACKGROUND

Device-to-device (D2D) communications is one means for improving the performance of LTE (Long Term Evolution) and other cellular networks. In D2D communications, terminals (referred to as user equipments or UEs in LTE) communicate with one another directly rather than being linked through the base station (referred to as an evolved node B or eNB in LTE). D2D communication between two or more D2D devices is typically very local, due to the short distance between D2D devices and uses very lower transmit power. D2D communications is also a powerful way to increase spatial reuse in cellular systems for higher throughput.

One approach to D2D communications as an underlay to an LTE network infrastructure is an out-of-band solution, in which the D2D traffic is unloaded to an unlicensed band (e.g., Wi-Fi as defined by the IEEE 802.11 standards) on the application layer. Another approach is an in-band solution, in which the D2D transmissions take place in the same licensed band used by the LTE network. The present disclosure deals with aspects of the in-band approach to D2D communications. In particular, the focus is on a signal structure for supporting in-band D2D communications, scheduling of D2D transmissions, and power control for interference management.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
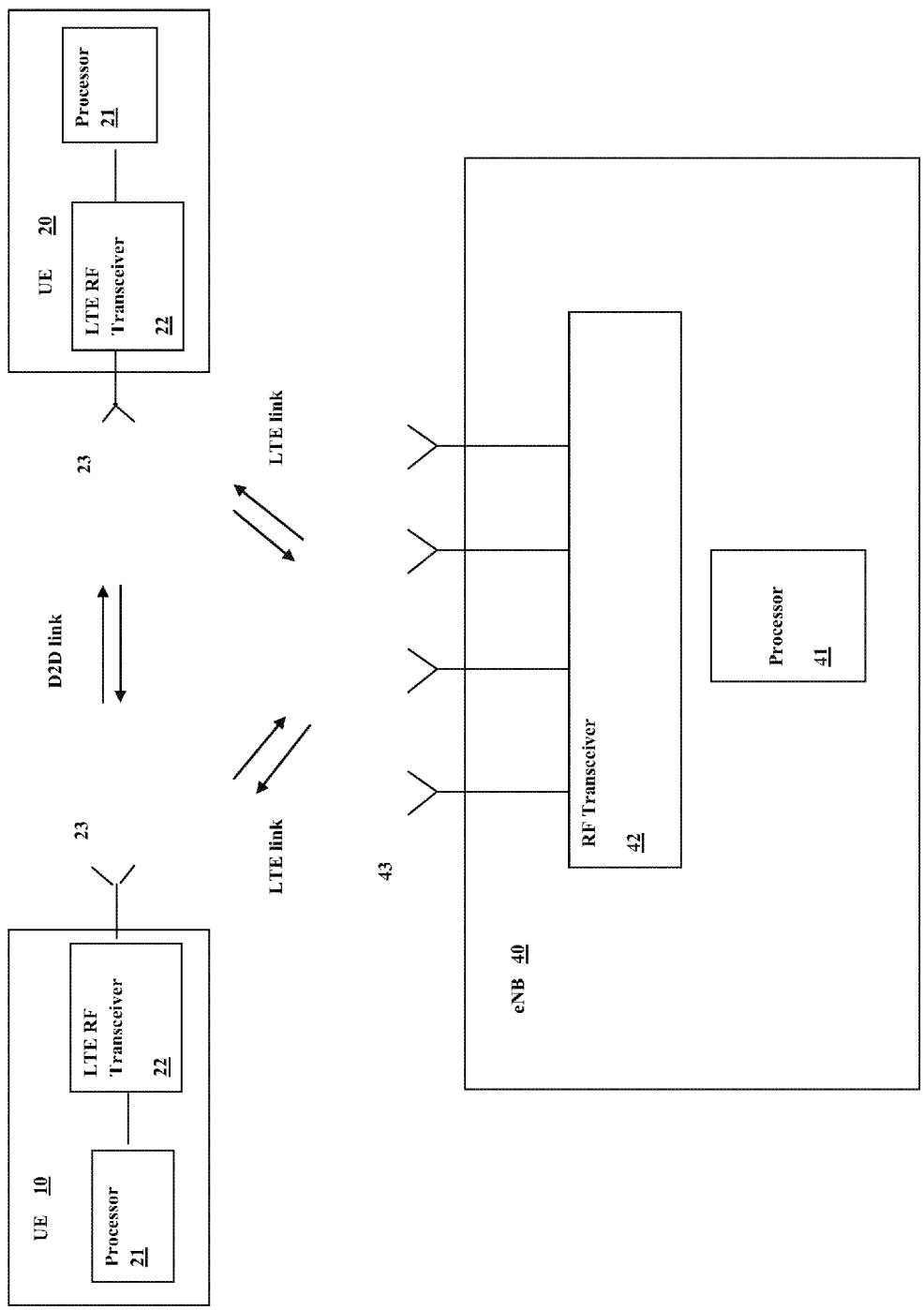
FIG. 1 shows example UE devices for D2D communications and an eNB.

FIG. 1 shows an example of a UE 10 and a UE 20, each of which incorporates a processor 21 interfaced to a radio-frequency (RE) transceiving circuitry 22 that is connected to one or more antennas 23. A base station or eNB 40 is shown with a processor 41 interfaced to an RF transceiving circuitry 42 that is connected to a plurality of antennas 43. The illustrated components are intended to represent any type of hardware/software configuration for providing air interfaces for both LTE and D2D communication and for performing the processing functions as described herein. In the embodiment shown in the figure, UEs 10 and 20 both communicate with the eNB 40 via LTE links and with one another via D2D link.

The physical layer of LTE is based upon orthogonal frequency division multiplexing (OFDM) for the downlink and a related technique, single carrier frequency division multiplexing (SC-FDM), for the uplink. In OFDM/SC-FDM, complex modulation symbols according to a modulation scheme such as QAM (quadrature amplitude modulation) are each individually mapped to a particular OFDM/SC-FDM subcarrier transmitted during an OFDM/SC-FDM symbol, referred to as a resource element (RE). An RE is the smallest time-frequency resource in LTE. LTE also provides for MIMO (multi-input multi-output) operation where multiple layers of data are transmitted and received by multiple antennas and where each of the complex modulation symbols is mapped into one of the multiple transmission layers and then mapped to a particular antenna port. Each RE is then uniquely identified by the antenna port, sub-carrier position, and OFDM/SC-FDM symbol index within a radio frame. LTE transmissions in the time domain are organized into radio frames, each having a duration of 10 ms. Each radio frame consists of 10 sub-frames, and each sub-frame consists of two consecutive 0.5 ms slots. Each slot comprises six indexed OFDM symbols for an extended cyclic prefix and seven indexed OFDM symbols for a normal cyclic prefix. A group of resource elements corresponding to twelve consecutive subcarriers within a single slot is referred to as a resource block (RB) or, with reference to the physical layer, a physical resource block (PRB). Each PRB pair consists of two slots sequential in time.

In the case of FIND (frequency division duplex) operation, where separate carrier frequencies are provided for uplink and downlink transmission, the above-described frame structure is applicable to both the uplink and downlink without modification. In TDD (time division duplex) operation, subframes are allocated for either uplink or downlink transmission with a special subframe occurring at the transition from downlink to uplink transmission (but not at the transition from uplink to downlink transmission). The eNB manages the allocation of uplink and downlink subframes within each radio frame during TDD operation.

D2D Signal Structure

With in-band D2D communications, UEs acting as D2D devices may communicate using time-frequency resources allocated for the D2D link by the eNB. Timing and synchronization is then done as in a conventional LTE link where each D2D device synchronizes its clock and symbol/slot boundary with the eNB as the conventional UE. Since D2D communications are usually within a short distance, the propagation time from the same eNB to the communicating D2D devices should be roughly the same. More precisely, the difference between the two timings (e.g. the symbol boundaries) of the communicating D2D pair should be around 0.2-1 µs, which is within the cyclic prefix of OFDM or SC-FDM, obviating the need for additional synchronization mechanisms. Although the timing and frequency synchronization can be achieved as in the conventional system, there are still additional aspects for D2D communications. There may be different eNBs such as macro eNB and pico eNB deployed in the area of the D2D devices. The eNBs from different operators may not synchronize each other or have the same OFDM symbol duration. Therefore, the time and/or frequency reference for the communicating D2D devices has to be specified. For example, the communicating D2D devices may associate with the same eNB and that eNB specifies an eNB e.g. a macro or a pico eNB for the synchronization. In addition to the timing and frequency synchronization, other physical and MAC layer parameters such as carrier frequency, bandwidth, cyclic prefix length, group ID, and D2D frequency-time resource are all needed to be specified by an eNB or a D2D coordinator or D2D group owner. Using time-frequency resources as allocated by the eNB, there are two modulation options for D2D data modulation, OFDM and SC-FDM, which are employed for the downlink and uplink in a conventional LTE device, respectively. The two schemes share most of the hardware components such as those for performing the FFT (fast Fourier transform) and IFFT (inverse fast Fourier transform). Although SC-FDM suffers less from a high PAPR (peak-to-average power ratio) than OFDM, it may still be desirable to use OFDM for D2D. First, since D2D communications is for short range, and its peak power should be much less than that of the conventional uplink transmission. Second, SC-FDM suffers from inter-symbol interference (ISI) while OFDM does not. Third, the channel training overhead is less for OFDM than SC-FDM.

In order for a D2D receiver to demodulate a received signal, a channel training signal is needed. For lowering the complexity of a UE that is also configured for D2D operations, the existing reference signal (RS) patterns used in LTE such as UE-RS or DM-RS may employed for D2D as well. However, the channel characteristics such as multipath delay and time variation are quite different for a D2D link compared with a typical LTE link. D2D devices are usually indoors and experience less mobility and delay spread than conventional UEs. Therefore, the RS density for the D2D link may be made smaller than that of a conventional cellular link, and reducing the RS density improves the throughput. Since either OFDMA or SC-FDM could be used for D2D communications, somewhat different channel training designs could be used for each. For OFDM, the channel training signal should be a set of reference subcarriers, which may a subset of the existing RS pattern. For example, with respect to a conventional LTE RB, only the existing RSs of the first slot of a PRB pair could be used for channel training with the RSs in the second slot used for data Besides taking a subset from the existing RSs, a different RS pattern may be used. For example, the RS subcarrier may be only located at the first OFDM symbol of the PRB pair for reducing channel estimation latency and channel training overhead. For SC-FDM, the channel training signal should be one or multiple reference symbols solely occupying the frequency band or the sub-band of the PRB during the symbol duration. Again, fewer RSs may be used for the D2D link than in a conventional LTE uplink RB, e.g., the second RS symbol in the RB may be replaced by a data symbol.

In conventional LTE communications, a UE only communicates with the eNB over both the downlink and uplink. This allows both the timing and power level to be controlled via various control channel signals between the eNB and the UE such as ranging and power control feedback. The situation is different in the distributed D2D case. Since one D2D device may receive signals from different D2D devices, the received power will typically vary from device to device. When a UE receives a signal over a radio frequency (RF) carrier, the signal is downconverted to baseband, amplified, and then digitized with an analog-to-digital converter (ADC) before being demodulated. Accurate digitization of the received signal, however, requires that the gain of the amplification be such that the resulting amplified signal will fall within a proper range of the ADC. For setting the AGC, a short preamble may be placed at the beginning of the transmission. This short preamble should be located at the same frequency band or sub-band as the subsequent data signal. The short preamble may comprise multiple periods of the same signal in the time domain, where the repetition of the same signal enables detection of the preamble via autocorrelation. The duration of the short preamble may be, for example, between 0.5 and 20 µs.

Figure 2:
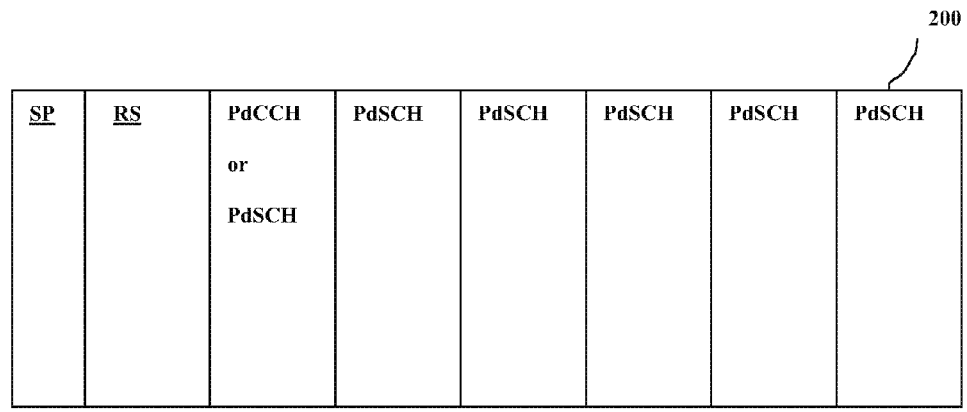
FIG. 2 illustrates a signal structure for D2D communications in one embodiment.
Figure 3:
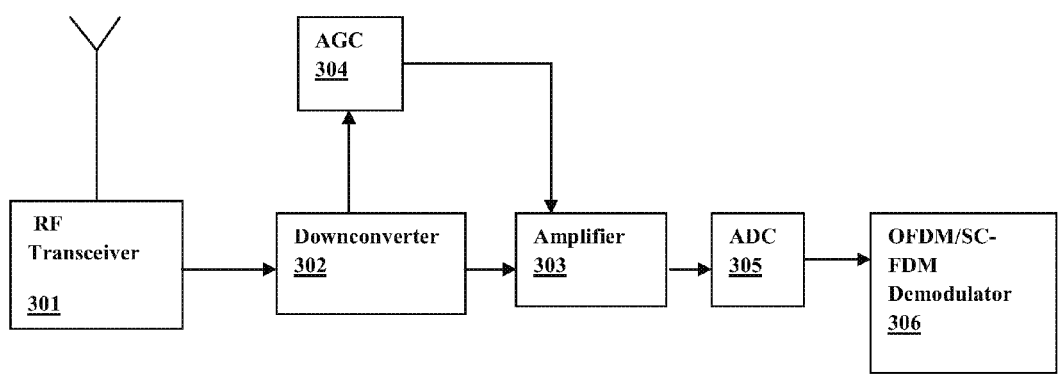
FIG. 3 shows the operation of an AGC in a D2D receiver in one embodiment.

Due to the small payload size of sensors, which may be the main part of D2D devices, 1 slot×1 RB can be defined as the basic resource allocation unit, referred to herein as a D2D slot or D2D packet. For large payload size the basic resource allocation unit can be 2 slot×1 RB. An example of a signal structure for a D2D packet 200 incorporating the features described above for SC-FDM is as shown in FIG. 2. Following the short preamble SP and a reference signal RS, are the SC-FDM symbols for carrying control information or data, which are carried by resource elements mapped to a physical D2D control channel (PdCCH) or a physical D2D shared channel (PdSCH), respectively. A D2D packet for OFDM would be similar except that the reference signals would be specific resource elements distributed in time and frequency. The cyclic prefixes of the OFDM or SC-FDM symbols may be made shorter than those used in the cellular LTE link. FIG. 3 illustrates the operation of a D2D receiver utilizing the short preamble of the D2D packet. After reception of the RF carrier signal by the RF transceiver 301, the resulting signal is downconverted to baseband by downconverter 302, amplified by amplifier 303, sampled and digitized by ADC 305, and then demodulated by OFDM/SC-FDM demodulator 306 to extract the transmitted symbols. Prior to digitization, automatic gain control module 304 detects the short preamble at the beginning of a D2D packet and, based upon the power of the signal, adjusts the gain of amplifier 303.

Distributed Scheduling Control

Within the in-band approach to D2D communications, there are basically two alternative techniques for scheduling transmissions. One relies on the base station, the eNB, to schedule and coordinate the D2D transmissions using the allocated time-frequency resources. The other technique mainly relies on the D2D devices themselves to contend for transmissions using those allocated time-frequency resources as well as manage any interference. The second technique is most suitable for sensor networks, which typically have small size packets but a large control overhead. For such small packets, scheduling and interference control by the eNB may be inefficient for at least two reasons. First, there will be a large number of D2D devices and links, and the eNB cannot be totally aware of the interference status between any two D2D links. And even if the eNB can ask D2D devices to report the interference measurements, the system may not be able to afford the large feedback overhead from those reports or the large control overhead in scheduling so many D2D transmissions.

Figure 4:
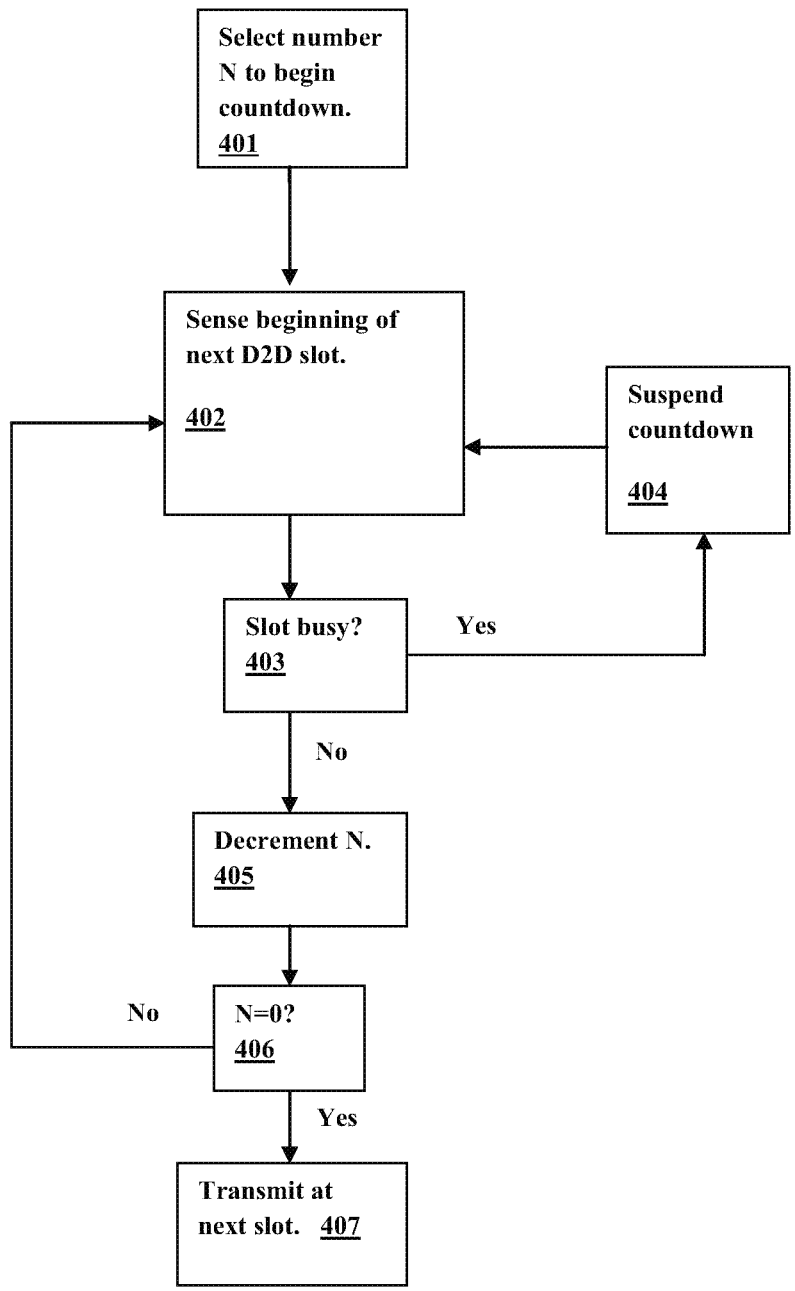
FIG. 4 shows an example algorithm performed by the D2D receiver in accessing the channel via CSMA.
Figure 5:
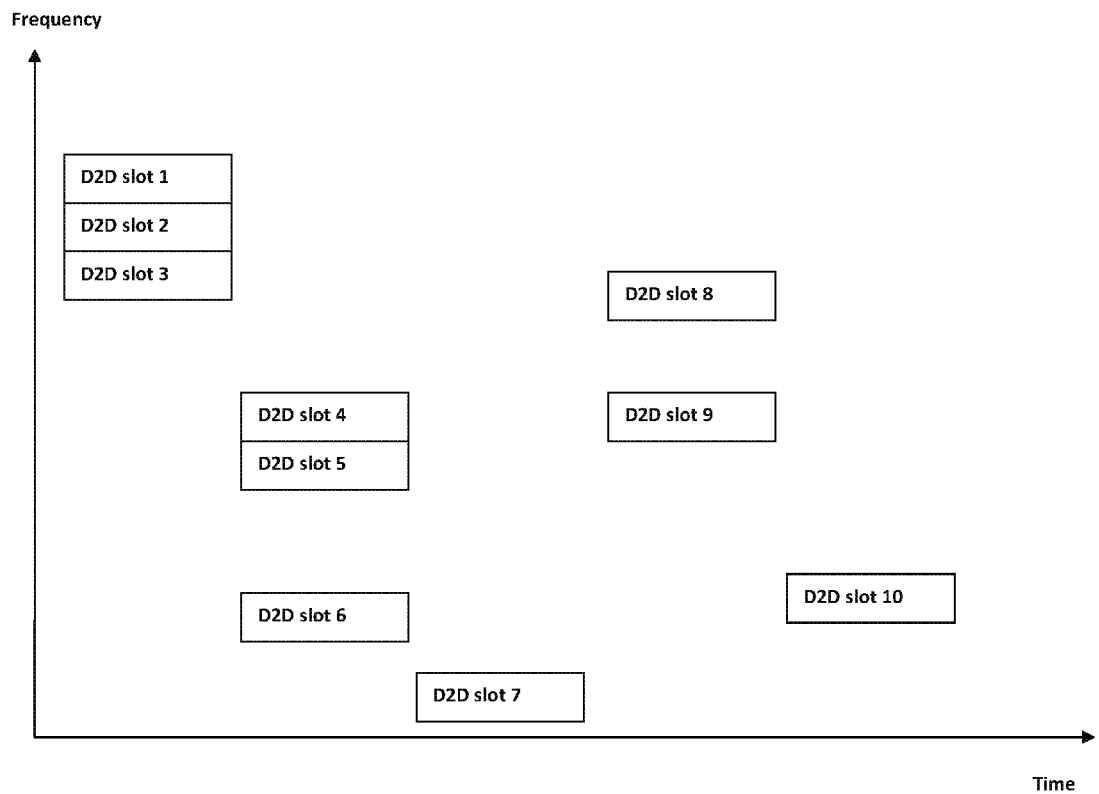
FIG. 5 illustrates an example of numbering designations used for D2D slots distributed in time and frequency.

In the technique for distributed scheduling control described here, carrier sensing multiple access (CSMA) is used for in-baud D2D communication. The CSMA not only achieves high spatial reuse but also reduces the control overhead between the D2D device and the eNB. As discussed earlier, the resources for D2D communications are allocated by the eNB. The eNB broadcasts the resource allocation to a group of D2D devices. The grouping of the devices may be according to the qualities of the channels between them. As described above, the resources may be divided into D2D slots or PRB pairs, where a group of allocated D2D slots or PRB pairs may be localized in time or/and frequency or may be distributed in frequency and time. In one embodiment, each such D2D slot is used as a time slot for slotted aloha-type CSMA incorporating a back-off mechanism to reduce collision frequency. The steps involved in an example algorithm are as shown in FIG. 4 for a D2D device that wishes to transmit. At step 401, the device randomly selects a number N to begin a countdown. At step 402, the device senses the beginning of the next D2D slot. If the slot is busy, the countdown is suspended at step 403 and step 402 is repeated. If the slot is not busy, N is decremented at step 404. If it is determined that N has been decremented to zero at step 405, the device transmits at the next slot at step 406. Otherwise, the device returns to step 402. The D2D slots may be labeled in sequential order as illustrated in FIG. 5 so that the countdown of slots within the back-off window can be conducted. The order of the slots in FIG. 5 is frequency first for reducing the delay and taking the half duplex operation of a D2D device into account.

In another embodiment, a transmitting D2D device may specify a reservation time in the PdCCH of a transmitted packet to indicate how long the device is to be transmitting. By detecting the reservation time specified in the PdCCH, D2D devices can skip the operation of carrier sensing and go to sleep state until the reservation time runs out. This reduces the power consumption of the D2D devices. Also, since the delay of aloha-type CSMA is unbounded, another embodiment involves using the eNB if needed to fulfill latency requirements. For example, the D2D device can ask the eNB to forward the D2D data to the destination D2D device if the D2D link cannot send the data out in time. This improves the latency of the D2D traffic by using eNB as a backup.

Power Detection and Control for Interference Management

Figure 6:
FIG. 6 is a diagram illustrating a problem with CSMA when transmission powers vary among D2D devices.

In the D2D system as described above, multiple D2D devices may contend for channel access and send data to other D2D devices. Since a D2D device may transmit data to different D2D devices at different distances, the transmission power should be varied according to the transmission distance for the purposes of reducing interference, increasing spatial reuse, and optimizing power efficiency. In a D2D network with a large number of nodes, carrier sensing multiple access (CSMA) such as described above is the most efficient way for channel access control. However, CSMA alone cannot support fair access among nodes with different transmission powers. The reason is that, a device can no longer predict its interference level at another device using the received signal from the conventional carrier sensing. For example, as illustrated in FIG. 6, node C would like to transmit and doesn't want to interfere with any existing transmissions on the air. Node C does carrier sensing and detects the existing transmission from node A to node B. In conventional CSMA, if the received signal power detected from the carrier sensing is below a certain threshold, node C should consider the channel idle and may access the channel. The assumption here, however, is that the interference level is reciprocal between any transmitter and receiver pair. If a receiver experiences an interference level from a transmitter, the transmitter should experience the same interference level when the original transmitter listens to the original receiver's transmitter. This relies on the fact that the wireless channel is reciprocal and the transmission power is constant among all nodes. However, when the transmission power varies across nodes, this assumption is no longer true. In the example in FIG. 6, node A and node B are close to each other, node A uses low power to talk to node B. The resultant interference from node A to node C is small because of the reduced transmission power. Therefore, if node C does not know that node A reduced its transmission power, node C may start transmitting with full power to talk to node B.

A solution to this problem involves specifying the transmit power level before the transmission so that the other nodes can predict the interference level. The transmit power level may be sent or broadcasted in a (D2D) control channel by the transmitter node or a coordinator node. Instead of using a control channel, which may be able to contain multiple types of control information, the transmit power level can be simply specified by a transmission power indicator added to the D2D packets. The advance specification of the transmission power before the actual transmission can be applied to CSMA and other types of medium access such as distributed scheduling. Since the transmit power level is for other nodes to predict their interference level in case they cause interference problems, this advance specification needs to be sent reliably. For example, high power transmission or reliable encoding such as repetition, spreading, and channel code may be applied for broadcasting the transmit power level. In a carrier sensing type of medium access, a D2D receiver wishing to transmit may then use the transmission power information for transmission power estimation during carrier sensing. In one embodiment, the transmit power level is signaled at the beginning of each transmission burst. After the transmit power level is detected or estimated, the path loss can be estimated by subtracting the received signal power from the transmitted power. Using the estimated path loss, the D2D receiver can decide if it can transmit and what transmit power level should be used. Described below are example techniques for transmitting the transmission power indicator.

Figure 7:
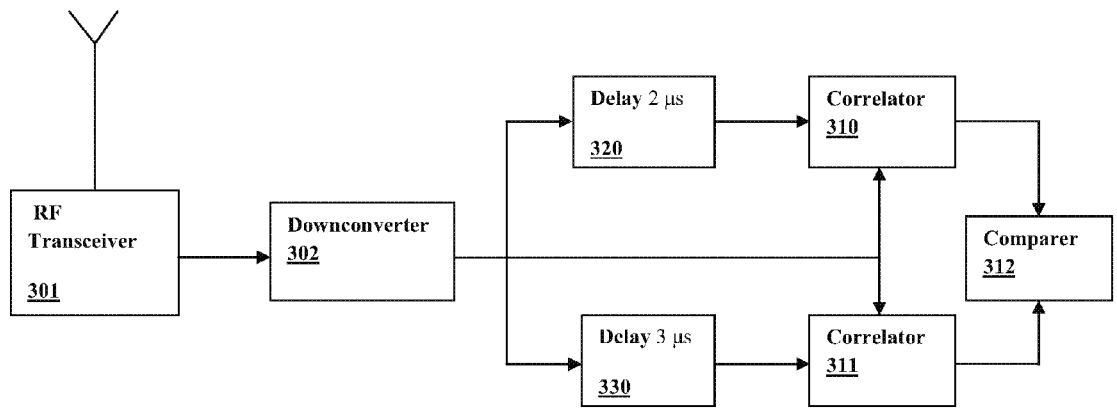
FIG. 7 shows the operation of an auto-correlator bank for detecting transmit power from the preamble.

In one embodiment, D2D packets with different transmission powers may be sent with different preamble sequences, where the sequence can be detected during the carrier sensing or during channel estimation. As described above, the D2D packet preamble may be also used for setting the adaptive gain control (AGC) or for channel estimation. For example, short preambles with different periods (e.g. 2 μs, 3 μs, or 5 μs) can be used for signaling the transmit power level and setting the AGC. The receiver can have a bank of auto-correlators with different correlation durations (e.g. 2 μs, 3 μs, or 5 μs) for detecting the signal arrival and transmit power level. An example of an auto-correlator bank in a D2D receiver used to distinguish between preamble periods of 2 μs and 3 μs is shown in FIG. 7. After reception by the RF transceiver 301 and downconversion to baseband by downconverter 302, versions of the signal delayed by 2 μs and 3 μs are produced by delay elements 320 and 330, respectively. The delayed versions of the signal are then correlated with the undelayed signal by correlators 310 and 311. The outputs of the correlators are then compared by comparer 312 to detect the periodicity of the preamble.

In another embodiment, rather than putting the transmit power indicator in the preamble sequence, the transmit power indicator (TPI) may be put in the channel training signals if one prefers using digital samples. For example, the TPI may be placed in the reference signals such as a single SC-FDM symbol used as the RS in SC-FDM or in the different resource elements used as reference signals in OFDM. A different channel training sequence can be applied for each different transmit power level. Since the number of power levels may be between four and eight, only a handful of sequences may be needed, and sequence detection error would be negligible at the operating SNR of the data frame. For distributed reference signals such as in OFDM, the transmission power can be detected during the entire D2D packet as compared to the other options. If the listener to the channel misses the beginning of the D2D packet, it can still learn about the transmission power later using the distributed reference signals.

If the number of transmit power levels is relatively large, the previous approaches may incur a high error rate in the sequence detection. In another embodiment to deal with this problem, the transmit power level can be signaled by the bits in the physical layer header. The physical layer header may follow the sequence for setting the AGC such as the short preamble. This reduces the latency of carrier sensing and the receiver power consumption. The receiver should decode the TPI bits from the header. The header may have CRC check bits to verify the detected TPI bits. As discussed above, besides the transmission power, the receiver may be also interested in the duration of the transmission for enabling collision avoidance. Such duration information, or channel reservation time, can be also in the header or implicitly specified by the system. In an example of an implicit specification, the duration may be always one subframe for some system.

In another embodiment, the transmission power level is signaled by channel reservation exchange before the data block transmission. This would be similar to the RTS/CTS channel reservation used in Wi-Fi. In cellular D2D, the channel reservation can be done by the transmitter and receiver with a default (high) power level such that other D2D devices in the vicinity can know about the reserved duration and the transmission power within the duration. As an alternative, the base station may broadcast the channel reservation and transmit power level to nearby D2D devices for a transmitting pair.

Example Embodiments

In one embodiment, a UE comprises a radio transceiver to provide an air interface for communicating with an eNB and for D2D communications and processing circuitry connected to the radio transceiver to: receive allocations of time-frequency resources for D2D communications from the eNB and establish a D2D communications session with a second UE. Where there are multiple eNBs, the processing circuitry may be to establish timing and frequency synchronization with the same &NB as the second UE. The resources or D2D transmissions to and from the second UE may be the same resource structures as used in a cellular LTE link or may be organized into D2D slots with each D2D slot beginning with a preamble and containing a plurality of OFDM/SC-FDM symbols. The cyclic prefix length of OFDM/SC-FDM symbols may be shorter than those used in the cellular LTE link. The processing circuitry may be to downconvert and amplify the preambles of received D2D slots prior to analog-to-digital conversion, wherein the preambles of received D2D slots are used for automatic gain control (AGC). The processing circuitry may be to use the preamble for AGC at the beginning of the data burst if the time since the last transmission to the second UE has been so long that the AGC setting may be out of the range. The preamble may be a repeating signal sequence in the time domain, and each D2D slot may includes one or more reference symbols. Channel training signals or reference signals of a D2D slot may have a lower density than used in the cellular LTE link. The processing circuitry may be further to detect the preamble of received D2D slots via autocorrelation. The processing circuitry may be further to initiate a communications session with the second LIE using carrier sense multiple access (CSMA) with respect to a D2D slot by: sensing a current D2D slot to determine if transmission activity is present; and, if the current D2D slot is not busy, sending a D2D transmission to the second UE at the start of a subsequent D2D slot. The processing circuitry may be further to initiate a communications session with the second UE by: if the current D2D slot is not busy, starting a countdown with a selected number; decrementing the countdown after each non-busy D2D slot is detected and suspending the countdown when a busy D2D slot is detected; and sending the D2D transmission to the second UE at the start of the next D2D slot after the countdown reaches zero. The specified number for the countdown may be randomly or pseudo-randomly selected. A D2D slot may further includes a reservation time encoded in a control channel that specifies how many D2D slots are to be consecutively transmitted by a transmitting device. The D2D slots may be numbered consecutively in the time and/or frequency domain. The processing circuitry may be further to, when a reservation time is detected in a D2D slot, discontinue sensing of D2D slots until the reservation time expires. The processing circuitry may be further to, when a reservation time is detected in a D2D slot, enter a sleep state until the reservation time expires. The processing circuitry may be further to transmit an indication of a transmission power level in each D2D slot. The preamble may be a repeating signal sequence in the time domain with a periodicity indicative of the transmission power level. The processing circuitry may further comprise a bank of correlators with different correlation durations for detecting arrival of the preamble and transmission power level.

In another embodiment, a UE comprises a radio transceiver to provide an air interface for communicating with an eNB and for D2D communications and processing circuitry connected to the radio transceiver to: receive allocations of time-frequency resources for D2D communications from the eNB and establish a D2D communications session with a second UE. The processing circuitry may be further to transmit the indication of transmission power level in one or more reference symbols, where a specified reference symbol or specified sequence of reference symbols indicates the transmission power level. The transmission power level may be specified before actual data transmission for enabling interference prediction when multiple transmit power levels coexist. The processing circuitry may be further to transmit and indication of transmission power level as encoded bits in a physical layer header following a preamble. The physical layer header may further comprise an indication of the number of D2D slots that make up a transport block and are to be consecutively sent. The processing circuitry may be further to receive allocations of time-frequency resources for D2D communications from the eNB in response to a channel reservation request, and wherein an indication of transmission power level for D2D communications and the duration of the reservation are contained in the channel reservation request. The channel reservation request may be transmitted at sufficiently high power that other UEs in proximity to the device may learn of the channel reservation and transmission power level.

In another embodiment, a LTE comprises a radio transceiver to provide an air interface for communicating with an eNB and for D2D communications and processing circuitry connected to the radio transceiver to: receive allocations of time-frequency resources for D2D communications from the eNB; establish a D2D communications session with a second UE, wherein D2D transmissions to and from the second UE are organized into D2D slots with each D2D slot containing a plurality of OFDM/SC-FDM symbols, by initiating a communications session with the second LE using carrier sense multiple access (CSMA) with respect to a D2D slot by: sensing a current D2D slot to determine if transmission activity is present; and, if the current D2D slot is not busy, sending a D2D transmission to the second UE at the start of a subsequent D2D slot. The processing circuitry may be further to initiate a communications session with the second UE by: if the current D2D slot is not busy, starting a countdown with a selected number; decrementing the countdown after each non-busy D2D slot is detected and suspending the countdown when a busy D2D slot is detected; and sending the D2D transmission to the second UE at the start of the next D2D slot after the countdown reaches zero. The specified number for the countdown may be randomly or pseudo-randomly selected. A D2D slot may further include a reservation time encoded in a control channel that specifies how many D2D slots are to be consecutively transmitted by a transmitting device. The processing circuitry may be further to, when a reservation time is detected in a D2D slot, discontinue sensing of D2D slots until the reservation time expires. The processing circuitry may be further to, when a reservation time is detected in a D2D slot, enter a sleep state until the reservation time expires.

The embodiments as described above may be implemented as methods for operation and/or in various hardware configurations that may include a processor for executing instructions that perform the methods. Such instructions may be contained in a suitable storage medium from which they are transferred to a memory or other processor-executable medium.

The subject matter has been described in the context of an LIE network. Except where inconsistencies would arise, the subject matter could be used in other types of cellular networks with references to a UE and eNB replaced by references to a terminal and base station, respectively.

The subject matter has been described in conjunction with the foregoing specific embodiments. It should be appreciated that those embodiments may also be combined in any manner considered to be advantageous. Also, many alternatives, variations, and modifications will be apparent to those of ordinary skill in the art. Other such alternatives, variations, and modifications are intended to fall within the scope of the following appended claims.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus of user equipment (UE) configured for direct device-to-device (D2D) communication with one or more other UEs, the apparatus comprising:
   a transceiver circuitry; and
   a processing circuitry, configured to:
   receive, from an enhanced node B (eNB), an allocation of resources for D2D communication;
   modulate control information, for a D2D transmission within resource elements (REs) of a physical D2D control channel, in accordance with a single-carrier frequency division multiplexing (SC-FDM) technique;
   modulate data, for a D2D transmission within REs of a physical D2D shared channel, in accordance with the SC-FDM technique;
   provide synchronization information for the D2D transmissions, the synchronization information based on signaling; and
   generate a demodulation reference signal (DMRS) for transmission within the resources allocated by the eNB for D2D communication, the DMRS configured for demodulation of the physical D2D control channel and the physical D2D shared channel,
   wherein the REs of the physical D2D control channel and the REs of the physical D2D shared channel are within the resources allocated by the eNB for D2D communication.

2. The apparatus of claim 1, wherein when frequency hopping is enabled, the REs of the physical D2D shared channel are determined in accordance with a predefined hopping pattern.

3. The apparatus of claim 1 wherein the UE is configured to include a cyclic prefix for the D2D transmissions, and
   wherein a length of the cyclic prefix for the D2D transmissions is different than a length of a cyclic prefix used for uplink transmissions to the eNB.

4. The apparatus of claim 3 wherein the length of the cyclic prefix for the D2D transmissions is shorter than the length of the cyclic prefix for the uplink transmissions.

5. The apparatus of claim 2, wherein the SC-FDM technique comprises modulation of symbols on a single carrier frequency.

6. The apparatus of claim 2, wherein the transceiver circuitry is configurable for transmission on multiple carrier frequencies in accordance with an orthogonal frequency division multiplexing technique and is configurable for transmission on a single carrier frequency in accordance with the SC-FDM technique, and
   wherein the processing circuitry is to configure the transceiver circuitry for single carrier frequency transmissions for the D2D transmissions, and is to configure the transceiver circuitry for multicarrier transmission for communication with the eNB.

7. The apparatus of claim 5 wherein the UE is further configured to receive D2D communication information from the eNB, and
   wherein the synchronization information is based on the D2D communication information received from the eNB.

8. The apparatus of claim 5 wherein the synchronization information is derived from signals received from the eNB.

9. The apparatus of claim 5 wherein the synchronization information is based on signaling received from another UE.

10. The apparatus of claim 1 wherein the UE is further configured to transmit a preamble preceding the D2D transmissions.

11. The apparatus of claim 1 further comprising one or more antennas.

12. A non-transitory computer-readable storage medium that stores instructions for execution by a processing circuitry of a user equipment (UE) to configure the UE for direct device-to-device (D2D) communication with one or more other UEs, the processing circuitry configured to:
modulate control information, for a D2D transmission within resource elements (REs) of a physical D2D control channel, in accordance with a single-carrier frequency division multiplexing (SC-FDM) technique;
modulate data, for a D2D transmission within REs of a physical D2D shared channel, in accordance with the SC-FDM technique; and
determine the REs of the physical D2D shared channel in accordance with a predefined hopping pattern when frequency hopping is enabled,
wherein the REs of the physical D2D control channel and the REs of the physical D2D shared channel are within resources allocated by an enhanced node B (eNB) for D2D communication.

13. The non-transitory computer-readable storage medium of claim 12 wherein e processing circuitry is further configured to:
receive, from the eNB, the allocation of resources for D2D communication;
provide synchronization information for the D2D transmissions, the synchronization information based on signaling received from the eNB; and
generate a demodulation reference signal (DMRS) for transmission within the resources allocated by the eNB for the D2D communication, the DMRS configured for demodulation of the physical D2D control channel and the physical D2D shared channel.

14. The non-transitory computer-readable storage medium of claim 13 wherein the UE is configured to include a cyclic prefix for the D2D transmissions, and
wherein a length of the cyclic prefix for the D2D transmissions is different than length of a cyclic prefix used for uplink transmissions to the eNB.

15. The non-transitory computer-readable storage medium of claim 14, wherein the SC-FDM technique comprises modulation of symbols on a single carrier frequency.

16. An apparatus of user equipment (UE) configured for device-to-device (D2D) communication, the apparatus comprising:
a transceiver circuitry; and a processing circuitry, configured to:
receive, from an enhanced node B (eNB), an allocation of resources for D2D communications;
decode D2D transmissions from another UE, the D2D transmissions including a physical D2D control channel and a physical D2D shared channel, the physical D2D control channel comprising control information modulated in accordance with a single-carrier frequency division multiplexing (SC-FDM) technique, the physical D2D shared channel comprising data modulated in accordance with the SC-FDM technique;
receive synchronization information for the D2D transmissions, the synchronization information based on signaling from the eNB; and
receive a demodulation reference signal (DMRS) transmitted by the other UE within the resources allocated by the eNB for the D2D communications, the DMRS configured for demodulation of the physical D2D control channel and demodulation of the physical D2D shared channel,
wherein the physical D2D control channel and the physical D2D shared channel are within the resources allocated by the eNB for the D2D communications.

17. The apparatus of claim 16, wherein when frequency hopping is enabled, resource elements (REs) of the physical D2D shared channel are determined in accordance with a predefined hopping pattern.

18. The apparatus of claim 16 wherein the UE is configured to decode a cyclic prefix that is part of the D2D transmissions, and
wherein a length of the cyclic prefix is different than a length of a cyclic prefix used for uplink transmissions to the eNB.

19. The apparatus of claim 18 further configured to receive transmissions from the eNB in accordance with a multicarrier communication technique.

20. The apparatus of claim 18, wherein the transceiver circuitry is configurable for reception on multiple carrier frequencies in accordance with an orthogonal frequency division multiplexing technique and is configurable for reception on a single carrier in accordance with the SC-FDM technique, and
wherein the processing circuitry is to configure the transceiver circuitry for single carrier frequency reception for the D2D transmissions, and is to configure the transceiver circuitry for multicarrier reception for communications with the eNB.

* * * * *

UNITED STATES PATENT AND TRADEMARK OFFICE
CERTIFICATE OF CORRECTION

PATENT NO. : 9,936,521 B2
APPLICATION NO. : 15/261439
DATED : April 3, 2018
INVENTOR(S) : Li et al.

Page 1 of 1

It is certified that error appears in the above-identified patent and that said Letters Patent is hereby corrected as shown below:

In the Claims

In Column 11, Line 23, in Claim 13, delete "wherein e" and insert --wherein the-- therefor Signed and Sealed this
Twenty-eighth Day of May, 2019

Andrei Iancu
*Director of the United States Patent and Trademark Office*